(12) United States Patent
Wajs et al.

(10) Patent No.: US 8,599,916 B2
(45) Date of Patent: Dec. 3, 2013

(54) RELIABLE AND NON-MANIPULATABLE PROCESSING OF DATA STREAMS IN A RECEIVER

(75) Inventors: Andrew Augustine Wajs, Haarlem (NL); Arnoud Evert Van Foreest, Leiden (NL); Gerard Johan Dekker, Nieuw-Vennep (NL); Bruce Victor Curtin, Haarlem (NL)

(73) Assignee: Irdeto B.V. (NL)

( * ) Notice: Subject to any disclaimer, the term of this patent is extended or adjusted under 35 U.S.C. 154(b) by 350 days.

(21) Appl. No.: 12/869,218

(22) Filed: Aug. 26, 2010

(65) Prior Publication Data

US 2011/0069222 A1    Mar. 24, 2011

(30) Foreign Application Priority Data

Aug. 28, 2009 (EP) .................................. 09168907

(51) Int. Cl.
    *H04L 9/00* (2006.01)
(52) U.S. Cl.
    USPC ...... 375/240.01; 375/219; 375/220; 375/221; 375/222; 348/425.1; 348/425.3; 348/425.4
(58) Field of Classification Search
    USPC ........... 375/240–241, 219–222; 348/425–426
    See application file for complete search history.

(56) References Cited

U.S. PATENT DOCUMENTS

| | | | | |
|---|---|---|---|---|
| 4,349,695 A | * | 9/1982 | Morgan et al. | 713/170 |
| 4,985,895 A | * | 1/1991 | Pelkey | 714/758 |
| 7,848,227 B2 | * | 12/2010 | Haag et al. | 370/218 |
| 2002/0035623 A1 | * | 3/2002 | Lawande et al. | 709/221 |
| 2002/0141432 A1 | * | 10/2002 | Min | 370/428 |
| 2004/0148501 A1 | * | 7/2004 | Livaditis et al. | 713/161 |
| 2005/0078677 A1 | * | 4/2005 | Benting et al. | 370/390 |
| 2005/0152546 A1 | * | 7/2005 | Kangas | 380/210 |
| 2006/0098649 A1 | * | 5/2006 | Shay | 370/389 |
| 2006/0110129 A1 | * | 5/2006 | Hamada | 386/83 |
| 2007/0183454 A1 | * | 8/2007 | Kim et al. | 370/486 |
| 2009/0067548 A1 | * | 3/2009 | Song et al. | 375/321 |

FOREIGN PATENT DOCUMENTS

| | | | | |
|---|---|---|---|---|
| EP | 1392060 | 2/2004 | | H04N 7/16 |
| EP | 1564991 | 8/2005 | | H04N 5/91 |
| EP | 1819075 | 8/2007 | | H04H 1/00 |

OTHER PUBLICATIONS

European Search Report for corresponding EP Application No. 09 16 8907, dated Aug. 11, 2010(2 pgs).

* cited by examiner

*Primary Examiner* — Christopher S Kelley
*Assistant Examiner* — Jonathan Messmore
(74) *Attorney, Agent, or Firm* — Hayes Soloway P.C.

(57) ABSTRACT

The invention provides a solution for secure and non-manipulatable processing of a data stream in a receiver, possibly in conjunction with a smartcard. A packet identity and a content type identifier associated with the packet identifier are received in encrypted form and securely processed within the receiver to allow an encrypted payload of the data stream to be processed without the possibility to manipulate the content type identifier in an attempt to intercept the payload after decryption.

17 Claims, 5 Drawing Sheets

RELIABLE AND NON-MANIPULATABLE PROCESSING OF DATA STREAMS IN A RECEIVER

CLAIM OF PRIORITY

The present patent application claims the benefit of priority under 35 U.S.C. §119 to European Patent Application (EPO) No. 09168907.5, filed Aug. 28, 2009, the entire contents of which are incorporated herein by reference.

FIELD OF THE INVENTION

The present invention relates to secure decryption and decoding of data streams in a receiver, possibly in conjunction with a smartcard.

BACKGROUND

Pay TV applications in a conditional access (CA) system use scrambling (also known as encryption) to secure digital TV broadcast streams. Receivers are used to obtain the relevant decryption keys to descramble the stream prior to the rendering of the digital TV streams. Such decryption key is also known as a control word or CW. In a head-end of a digital TV station a sequence of CWs is associated with one or more elementary streams such as audio, video, subtitling, teletext and/or applets. For MPEG2 streams, the elementary streams are identified by a PID (packet identifier). The stream of CWs is usually identifiable by a CW_stream_Id. In the MPEG2 standard, the list of PIDs that make up a TV service (a program stream in MPEG2 terminology) is contained in a clear text PMT (program map table). The CA system employs a similar data structure to map the CW_Stream_ID to a number of PIDs. A decoder in de receiver processes the PMT and a smartcard of the CA system processes the information that links the CW_Stream_ID(s) to the relevant PIDs and sets up the receiver to load the relevant keys to descramble the elementary streams.

To prevent unauthorized access to clear text digital TV streams, it is known to implement the descrambling and the decoding of the digital TV signals in a secure domain of the receiver, typically in a secure chip or chipset.

Known receivers typically take the following steps in processing a MPEG2 stream. MPEG2 packets are received and demodulated. The PID and a scrambling control field are extracted from the MPEG2 header. A CW lookup table in a memory of the receiver is searched for an entry with a matching PID value and associated CW keys are read from the table. The scrambling control field value is used to select from the associated CW keys the CW that needs to be loaded in the descrambler. The scrambled payload of the MPEG2 packet is decrypted in de descrambler using the CW. Information from the clear text MPEG2 PMT is used to determine a stream_type of the packet. The stream_type is a content type identifier identifying the type of content, e.g. audio, video, subtitling, teletext or applet. The stream_type is used to send the packet to the appropriate decoding module.

For the processing of the MPEG2 stream the receiver typically uses the following inputs: the PID value and the scrambling control field from the MPEG2 Packet header and the clear text MPEG2 PMT information of which in particular the PID of the elementary stream and the stream_type associated with the PID.

In order to ensure the intended operation of the receiver, all these input data need to provide accurate information. As the PMT and the MPEG2 packet header are provided in clear text, they can be manipulated before the processing in the receiver. This enables an attacker to change a PID value or a stream_type value and e.g. have a video and audio elementary stream look like a teletext stream. Video streams and audio streams are typically processed in a secured domain of the receiver, while, after descrambling, teletext streams are processed outside the secured domain. Such manipulating of the inputs thus causes the descrambled video and audio elementary stream to exit the secure domain, enabling unauthorized access to these streams and making the processing of the streams unreliable.

SUMMARY OF THE INVENTION

It is an object of the invention to improve secure processing of data streams.

According to an aspect of the invention a method in a receiver is proposed for processing a data stream. The data stream comprises a header and an encrypted payload. The header comprises a first packet identifier. The method comprises the step of decrypting the encrypted payload to obtain a decrypted payload. The method further comprises the step of receiving an encrypted second packet identifier and an encrypted first content type identifier. The method further comprises the step of obtaining a second packet identifier from the encrypted second packet identifier within a secured environment. The method further comprises the step of obtaining a first content type identifier associated with the second packet identifier from the encrypted first content type identifier within the secured environment. The method further comprises the step of comparing the first packet identifier with the second identifier to obtain a first comparison result. The method further comprises the step of: if the first comparison result matches a first predetermined condition, selecting a first decoding module based on the first content type identifier and routing the decrypted payload to the first decoding module for decoding the decrypted payload.

According to an aspect of the invention a receiver is proposed for processing a data stream. The data stream comprises a header and an encrypted payload. The header comprises a first packet identifier. The receiver comprises a descrambler configured to decrypt the encrypted payload to obtain a decrypted payload. The receiver further comprises a first input module configured to receive an encrypted second packet identifier and an encrypted first content type identifier. The receiver further comprises a processor, a memory and a router. The processor is configured to obtain a second packet identifier from the encrypted second packet identifier. The processor is further configured to obtain a first content type identifier associated with the second packet identifier from the encrypted first content type identifier. The processor is further configured to store the second packet identifier and the first content type identifier in the memory. The processor is further configured to compare the first packet identifier with the second packet identifier stored in the memory to obtain a first comparison result. The processor is further configured to: if the first comparison result matches a first predetermined condition, provide the first content type identifier to the router. The router is configured to select a first decoding module based on the first content type identifier. The router is further configured to route the decrypted payload to the first decoding module for decoding the decrypted payload.

The first predetermined condition is e.g. that the first packet identifier equals the second packet identifier.

Thus, the first content type identifier and the associated second packet identifier are securely provided to the receiver for processing, i.e. received in encrypted and thereby non-manipulatable form. Moreover, the processing of the decrypted payload is dependent on the non-manipulatable first content type identifier. Advantageously, this considerably complicates changing the content type identifier before processing in the receiver.

The embodiment of claim 2 advantageously enables the use of entitlement control messages and/or entitlement management messages for the secured distribution of the first content type identifier.

According to an aspect of the invention a method in a receiver is proposed for processing a data stream. The data stream comprises a header and an encrypted payload. The header comprises a first packet identifier. The method comprises the step of decrypting the encrypted payload to obtain a decrypted payload within a secured environment. The method further comprises the step of obtaining a second packet identifier from a hardcoded memory within the secured environment. The method further comprises the step of obtaining a first content type identifier associated with the second packet identifier from the hardcoded memory. The method further comprises the step of comparing the first packet identifier with the second identifier to obtain a first comparison result. The method further comprises the step of: if the first comparison result matches a first predetermined condition, selecting a first decoding module based on the first content type identifier and routing the decrypted payload to the first decoding module for decoding the decrypted payload.

According to an aspect of the invention a receiver is proposed for processing a data stream. The data stream comprises a header and an encrypted payload. The header comprises a first packet identifier. The receiver comprises a descrambler configured to decrypt the encrypted payload to obtain a decrypted payload. The receiver further comprises a processor and a router. The processor is configured to obtain a second packet identifier and a first content type identifier from a hardcoded memory. The processor is further configured to compare the first packet identifier with the second packet identifier stored in the hardcoded memory to obtain a first comparison result. The processor is further configured to: if the first comparison result matches a first predetermined condition, provide the first content type identifier to the router. The router is configured to select a first decoding module based on the first content type identifier. The router is further configured to rout the decrypted payload to the first decoding module for decoding the decrypted payload.

The first predetermined condition is e.g. that the first packet identifier equals the second packet identifier.

Thus, the first content type identifier and the associated second packet identifier are securely provided to the receiver for processing, i.e. obtained from a hardcoded memory and thereby non-manipulatable form. Moreover, the processing of the decrypted payload is dependent on the non-manipulatable first content type identifier. This advantageously makes it impossible to change the content type identifier before processing in the receiver.

The embodiment of claim 4 advantageously enables the hardcoded memory within the receiver.

The embodiment of claim 5 advantageously enables the hardcoded memory within a smartcard.

The embodiments of claims 6 and 11 advantageously enable restricting the output of the decoder to a predefined interface, such as e.g. a HDMI/HDCP-interface, a DVI/HDCP-interface or a DRM protected interface. HDMI, HDCP, DVI and DRM are known abbreviations for High-Definition Multimedia Interface, High-Bandwidth Digital Content Protection, Digital Visual Interface and Digital Rights Management, respectively.

The embodiments of claims 7 and 12 advantageously enable less secured processing of decrypted payload for which unauthorized access would be allowable. The second predetermined condition is e.g. that the first packet identifier differs from the second packet identifier. The third predetermined condition is e.g. that the first packet identifier equals the third packet identifier.

The embodiment of claim 8 advantageously enables secure and non-manipulatable processing of MPEG2 streams.

The embodiment of claim 13 advantageously prevents tapping of signals within the receiver.

According to an aspect of the invention a smartcard is proposed for use in a receiver having one or more of the above described features. The smartcard comprises an input module configured to receive an encrypted second packet identifier and an encrypted first content type identifier from the receiver. The smartcard further comprises a decryptor configured to decrypt the encrypted second packet identifier to obtain a second packet identifier and to decrypt the encrypted first content type identifier to obtain a first content type identifier associated with the second packet identifier. The smartcard further comprises an output module configured to provide the second packet identifier and the first content type identifier to the receiver.

Thus, a smartcard can advantageously be used for securely obtaining the second packet identifier and the first content type identifier and securely providing these to the receiver.

According to an aspect of the invention a smartcard is proposed for use in a receiver having one or more of the above described features. The smartcard comprises a hardcoded memory. The hardcoded memory comprises a second packet identifier and a first content type identifier associated with the second packet identifier. The smartcard further comprises an output module configured to provide the second packet identifier and the first content type identifier to the receiver.

Thus, a smartcard can advantageously be used for securely obtaining the second packet identifier and the first content type identifier and securely providing these to the receiver.

Hereinafter, embodiments of the invention will be described in further detail. It should be appreciated, however, that these embodiments may not be construed as limiting the scope of protection for the present invention.

BRIEF DESCRIPTION OF THE DRAWINGS

Aspects of the invention will be explained in greater detail by reference to exemplary embodiments shown in the drawings, in which.

DETAILED DESCRIPTION OF THE DRAWINGS

In a CA system a receiver is a device that receives a data stream from which encrypted data packets are extracted and processed. The data stream can be received as a broadcast stream or originate from a file stored on e.g. a hard disk or DVD disc. The data packets have a header and an encrypted payload. In the receiver the encrypted payload is decrypted and decoded to allow playback on an end-user device such as a television, pc or audio playback device. Depending on the type of content a particular decoder is used. Types of content are e.g. audio, video, subtitling, teletext and applets. Some types of content are of particular interest to hackers because of its premium characteristics, such as video and audio streams.

The data stream is e.g. a MPEG2 stream conforming with the ISO 13818-1 standard. The MPEG2 stream typically contains multiple elementary streams each containing data packets with a header and a payload. The header contains a packet identifier (PID). The payload contains content belonging to a particular content type. According to the MPEG2 standard a PMT is separately provided to the receiver in clear text, possibly as a data structure within the payload. The PMT contains information linking a PID to a content type identifier called stream_type. Comparing the PID received in the elementary stream with the PID received in the PMT makes it possible to find the stream_type of the payload. The nature of the PMT being clear text makes it manipulatable by hackers.

The present invention provides protection against such manipulations by providing input data securely to the receiver. The input data includes, amongst others, the content type identifier for an identifiable payload. The input data is used within the receiver where it is protected from manipulation. Hereto the input data is either encrypted in the broadcast stream or, alternatively, hardcoded in a memory. In case a smartcard is used to obtain the input data, existing techniques can be used to securely exchange data between the receiver and the smartcard. Within the receiver the payload and input data are preferably processed within a secured chip or secured chipset ensuring that the data signals cannot be tapped.

Figure 1A:
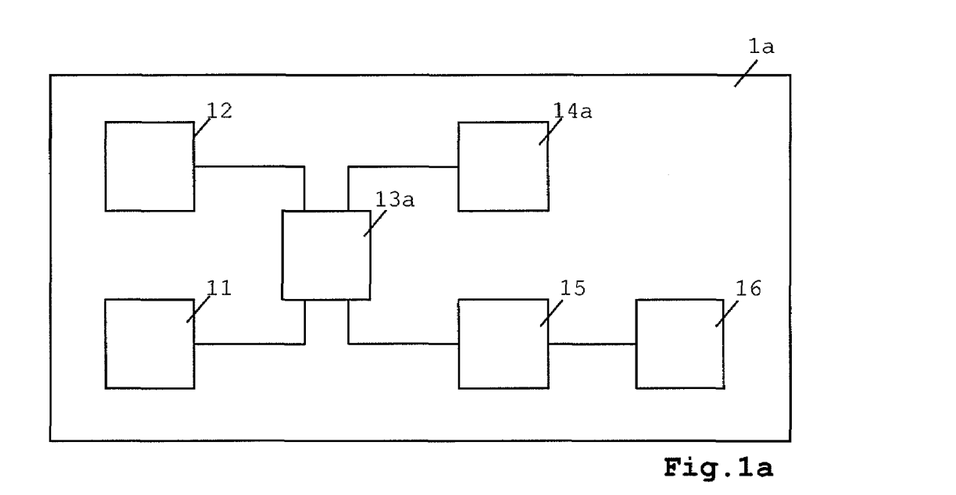
FIG. 1a shows a receiver of an exemplary embodiment of the invention.

In FIG. 1a a receiver 1a is shown. Through a first input module 12 input data is securely received. The input data as received is encrypted and contains a PID and a stream_type associated with the PID. Processor 13a obtains the PID and stream_type from the input data, e.g. by decrypting the input data within the receiver 1a or by having the input data decrypted by a smartcard. The obtained PID and stream_type are stored in the memory 14a for later reference. Multiple PIDs and associated stream_types can be obtained and stored in the memory 14a. It is possible to have ranges of PIDs associated with a stream_type to allow a more efficient storage in the memory 14a.

The receiver 1a further contains a descrambler 11 for decrypting an encrypted payload of a data packet. The encrypted payload originates e.g. from an MPEG2 elementary stream or from a file. The data packet has a header containing a PID identifying the payload. After decrypting the encrypted payload, the decrypted payload is to be decoded by a particular decoder. The decoder is selected by comparing the PID from the header of the data packet with the PIDs stored in the memory 14a. When a match is found, the associated stream_type is read from the memory and a corresponding decoder module 16 is selected. The stream_type is e.g. indicative of the decoder module 16 to be used or the stream_type allows a lookup in a table to find the corresponding decoder module 16. Any other mechanisms to find the decoder module 16 with the stream_type may be used. The router 15 routes the decrypted payload to the selected decoder module 16 where it can be decoded.

Figure 1B:
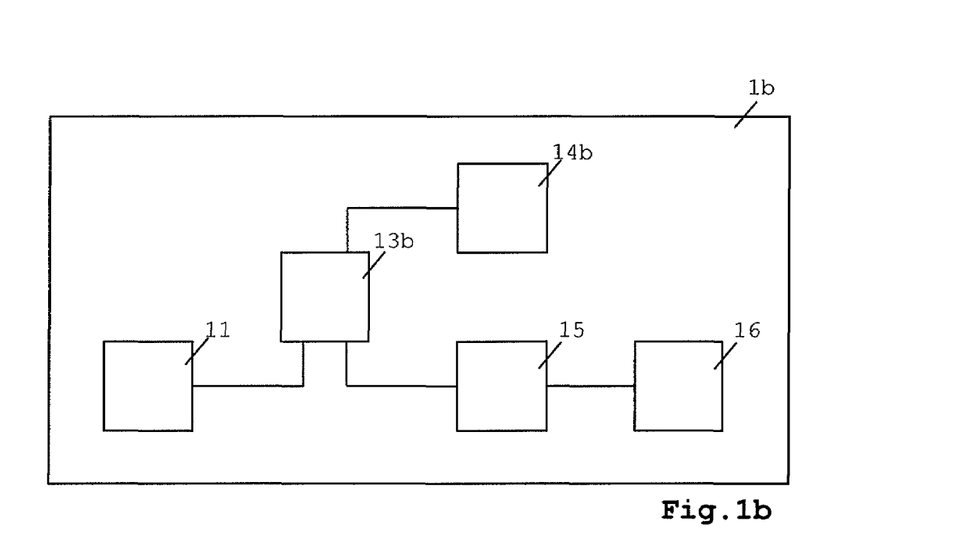
FIG. 1b shows a receiver of an exemplary embodiment of the invention.

In FIG. 1b an alternative receiver 1b is shown. In receiver 1b PIDs and associated stream_types are hardcoded in a memory 14b and thus need not be provided through an input module, such as input module 12, in receiver 1a. Apart from the secure reception of the input data through input module 12, receiver 1b operates in a similar manner as receiver 1a. In FIG. 1b the memory 14b is internal to the receiver 1b. The memory 14b can alternatively be provided in a smartcard accessible by the receiver 1b.

Figure 2A:
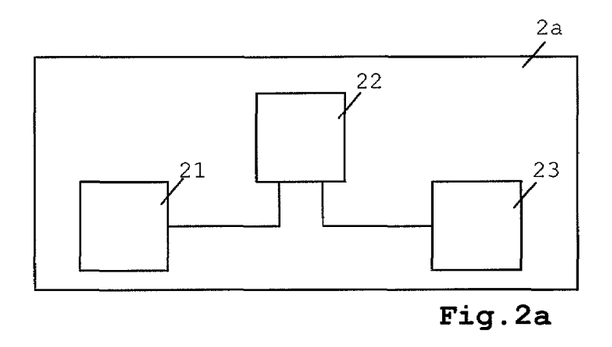
FIG. 2a shows a smartcard of an exemplary embodiment of the invention.

In FIG. 2a a smartcard 2a is shown that can be used with the receiver 1a as shown in FIG. 1a to obtain the PID and associated stream_type. Input module 21 receives the encrypted input data containing the encrypted PID and encrypted stream_type from the receiver. Decryptor 22 decrypts the input data and the thus obtained decrypted PID and stream_type is provided to the receiver 1a through output module 23. The interface between the smartcard 2a and the receiver 1a is secured using any known smartcard interface technology.

Figure 2B:
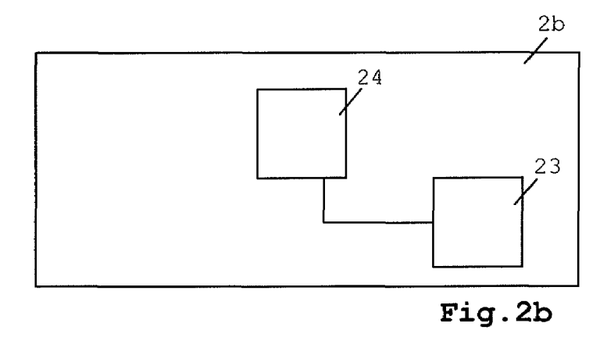
FIG. 2b shows a smartcard of an exemplary embodiment of the invention.

FIG. 2b shows an alternative smartcard 2b that can be used with the receiver 1b as shown in FIG. 1b to obtain the PID and associated stream_type. The PID and associated stream_type are stored in hardcoded memory 24 and provided to the receiver 1b through output module 23.

Figure 3:
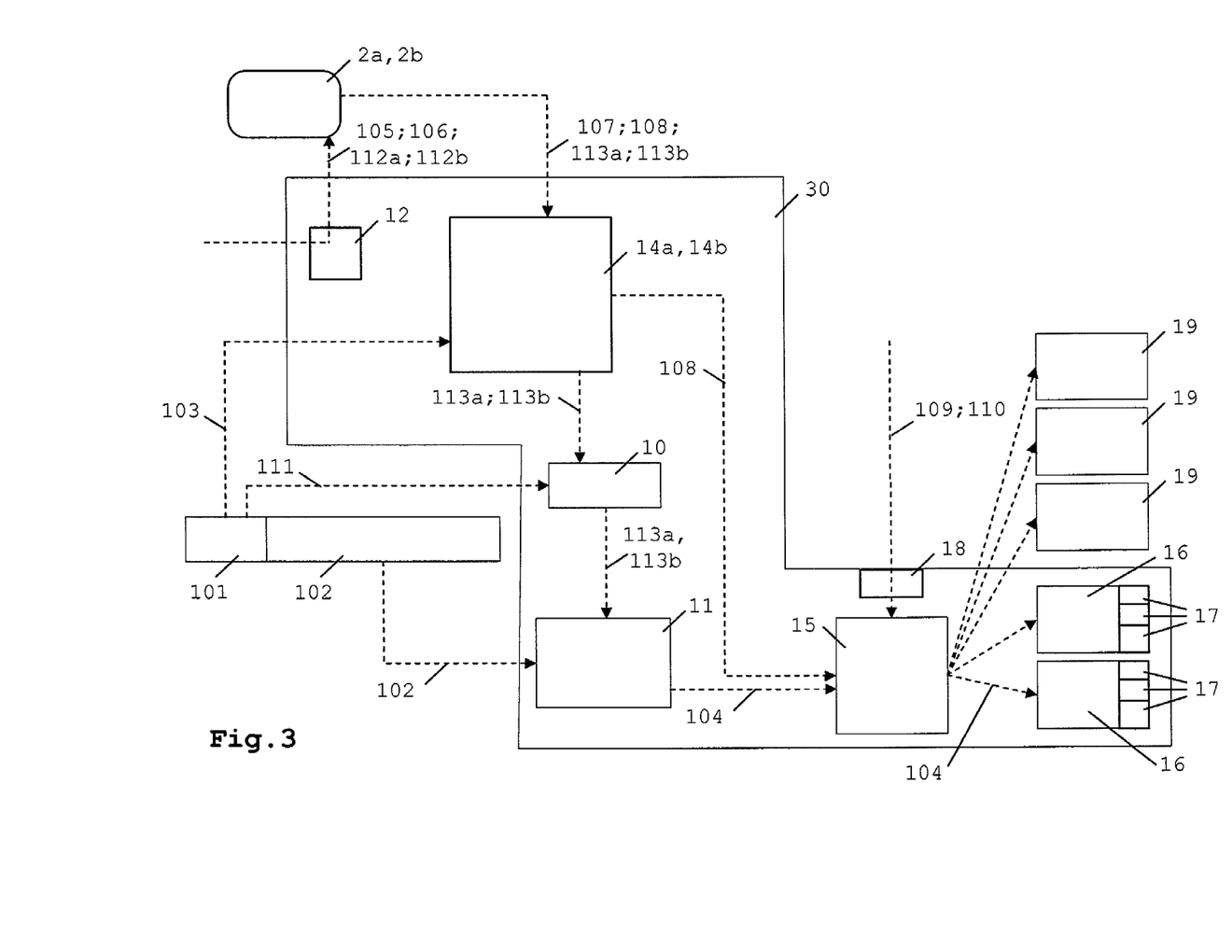
FIG. 3 shows data flows in a receiver and a smartcard of an exemplary embodiment of the invention.

In FIG. 3 shows in more detail how data is processed in a receiver of an exemplary embodiment of the invention. For simplification purposes, the processor 13a,13b is not shown. Data flows are indicated by dashed arrows. References separated by a comma indicate alternatives. References separated by a semicolon indicate multiple data flows between elements. Memory 14a,14b is either the hardcoded memory 14b in which case the smartcard 2a,2b is not used, or the memory 14a in which case the smartcard 2a,2b is used to either obtain the PID and associated stream_type from encrypted input data in smartcard 2a or obtain the PID and associated stream_type from a hardcoded memory 24 in smartcard 2b.

In the memory 14a,14b PIDs and associated stream_types are stored. Moreover, PIDs and associated CWs are stored. The CWs are received in the receiver in a manner known per se, e.g. in entitlement control messages (ECMs) wherein two CWs are associated to a PID for a predefined timeframe. The two CWs are called odd CW and even CW, which can be selected using a scrambling control field in the header of the data packet containing the encrypted payload. An example of how the PIDs, stream_types and CWs can be stored is shown in the following table, which can be used as a trusted information lookup table. Any other structure for storing these data may be used, as long as the stream_types can be associated with PIDs and the CWs can be associated with PIDs.

| Trusted Information Lookup Table | | | |
| --- | --- | --- | --- |
| PID | CW_odd | CW_even | Stream_type |
| 101 | CW1 | CW2 | video |
| 201-299 | CW3 | CW4 | 1 |
| $\{\overline{0}_{100}\} \geq 0$ | CW1 | CW2 | audio |

The trusted information lookup table contains three rows with data. In the first row a PID with value "101", an odd CW with value "CW1", an even CW with value "CW2" and a stream_type with value "video" are stored. Thus CW1 and CW2 are associated with PID 101 and the PID 101 is associated to the stream_type video. In the second row a range of PIDs 201-299 are associated to CW3, CW4 and stream_type 1, wherein the value 1 of the stream_type represents e.g. video. In the third row a range of PIDs $\{o_{100}\} \geq 0$, i.e. $\{0, 100, 200, \ldots\}$, is associated to CW1, CW2 and stream_type audio.

Referring to FIG. 3, in the following example a PID and associated CWs are received in an ECM, and a PID and associated stream_type are received in an entitlement management message (EMM). The ECM and EMM are received by a first input module 12 in a secured domain 30 of receiver 1a and forwarded to smartcard 2a through a secure interface between the receiver 1a and the smartcard 2a. Encrypted odd CW 112a and encrypted even CW 112b are decrypted in the smartcard 2a and provided through the secure interface as decrypted odd CW 113a and decrypted even CW 113b, together with PID information from the ECM, to the receiver 1a where they are stored in memory 14a. Encrypted PID 105 and encrypted stream_type 106 are also decrypted in the smartcard 2a and provided as decrypted PID 107 and decrypted stream_type 108 to the receiver 1a where they are stored in memory 14a. When an MPEG2 elementary stream is received, data fields are extracted from the header 101 of the elementary stream and the encrypted payload 102 of the elementary is fed into descrambler 11. Among the data fields extracted from the header are the PID 103 identifying the payload and the scrambling control field 111 identifying whether the odd CW or the even CW is to be used for decrypting the encrypted payload.

The CWs 113a;113b for PID 103 are looked up in the memory 14a and based on the value of the scrambling control field 111 switch 10 provides either odd CW 113a or even CW 113b to the descrambler 11. Descrambler 11 decrypts the encrypted payload 102 using the provided odd CW 113a or even CW 113b. After decrypting the payload, the stream_type 108 is sent to a router module 15 along with the decrypted payload 104. The router module 15 uses stream_type 108 from the Trusted Information Lookup Table stored in memory 14a to select the appropriate decoder for decoding the decrypted payload 104. Contrary to prior art, PID 109 and stream_type 110 information provided in a clear text PMT and received through second input module 18 are thus not used. If the stream_type is empty (nil), i.e. not available in the memory 14a, or invalid, the router can be configured to use the information from the PMT. The second input module 18 and the first input module 12 can be one and the same.

The stream_type 108 in the secured domain 30 can contain or have associated routing information for decoding modules 16. This enables that e.g. transmission of premium content is restricted to secured output interfaces 17 such as HDMI and not on unprotected high quality analogue interfaces such as SCART and S-video.

There are a number of ways to implement the loading and provisioning of trusted stream_types. A CA system usually provides a mechanism to associate PID values with a stream of CWs referenced by a CW_Stream_ID. This mechanism allows several elementary streams to share a CW value. The association of a CW_Stream_ID with PID values occurs prior to the transmission of the sequence of CWs for that CW_Stream_ID. The ECMs thus contain at least an encrypted version of the CW_Stream_ID and the CW 112a, 112b. The list of PIDs for a CW_Stream_ID provides a good basis for the additional trusted stream_type 107. Instead of a single PID value, the CW_Stream_ID association then consists of an array of {PID 107, stream_type 108} pairs. After processing the list of CW_Stream_ID associations, the smartcard 1a can use a secure information loading protocol to transmit the trusted stream_type 108 to the secured domain 30 of the receiver 1a.

Alternatively a special data stream is defined containing the trusted stream_type 108 for a number of PID values 107. In order to prevent modifications to the data, this special data stream is encrypted. The special data stream is decrypted in a descrambler in the secured domain 30 of the receiver, possibly descrambler 11. The association between PID 107 and stream_type 108 is parsed and stored in memory 14a for use in the secured domain 30.

Alternatively two separate CW Lookup tables and separate key ladders are created to load the CWs. Known key ladder modules can be used for this purpose. One CW lookup table contains information for streams that need to stay within the secured domain 30 and the other CW lookup table covers elementary streams that are allowed to be decoded by decoders 19 outside the secured domain 30. A binary stream_type can be used for this purpose having either the value of 1 or the value of 0. The key ladder module implements a secure session process to load CWs 113a,113b directly into the secured domain 30 of a chip using a simple key hierarchy that is embedded into a one time programmable memory structure of the chip.

Other alternative methods may be used for the provisioning of the CWs and stream_types to the receiver 1a.

Figure 4A:
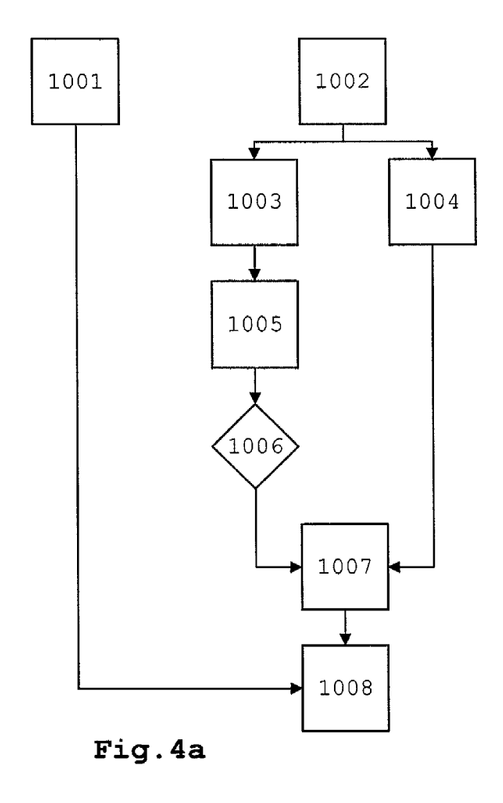
FIG. 4a shows a schematic view of steps of a method performed in a receiver of an exemplary embodiment of the invention.

FIG. 4a shows the steps of a method performed in a receiver of an exemplary embodiment of the invention, e.g. the receiver shown in FIG. 1a. Preferably the steps are performed in a secured chip 30 of the receiver 1a. In step 1001 encrypted payload 102 of an elementary stream such as encrypted video payload is decrypted into decrypted video 104. In step 1002 an ECM or EMM is received with an encrypted PID 105 and encrypted stream_type 106. PID 105 is decrypted and stored in memory 14a in step 1003 and stream_type 106 is decrypted and stored in memory 14a in step 1004. The decrypted PID 107 is compared with a PID 103 of the video payload in step 1005. Hereto the PID 103 is extracted from the header of the elementary stream and compared with PIDs stored in the memory 14a. If a match is found, which is indicated by step 1006, the stream_type 108 associated with the PID 103 (or PID 107, which is identical in this case) is read from the memory 14a and used in step 1007 to select a video decoding module 16 for decoding the video payload. In step 1008 the decrypted video payload is routed to the video decoding module 16.

Figure 4B:
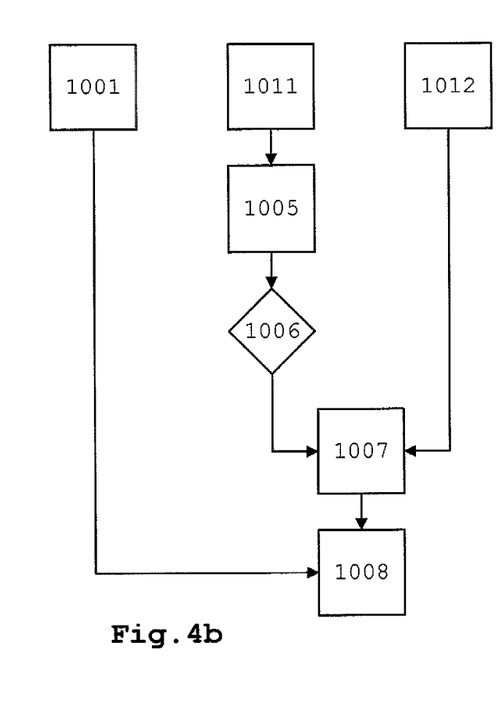
FIG. 4b shows a schematic view of steps of a method performed in a receiver of an exemplary embodiment of the invention.

FIG. 4b shows the steps of an alternative method performed in a receiver of an exemplary embodiment of the invention, e.g. in the receiver shown in FIG. 1b. The method differs from FIG. 1a in that instead of receiving an ECM or EMM to obtain the PID 107 and associated stream_type 108, the PID 107 and stream_type 109 are hardcoded in a memory, e.g. in hardcoded memory 14b of receiver 1b or in hardcoded memory 24 of smartcard 2b. In step 1011 the PID 107 is read from the hardcoded memory 14b or 24 and in step 1012 the stream_type is read from the hardcoded memory 14b or 24.

Figure 5:
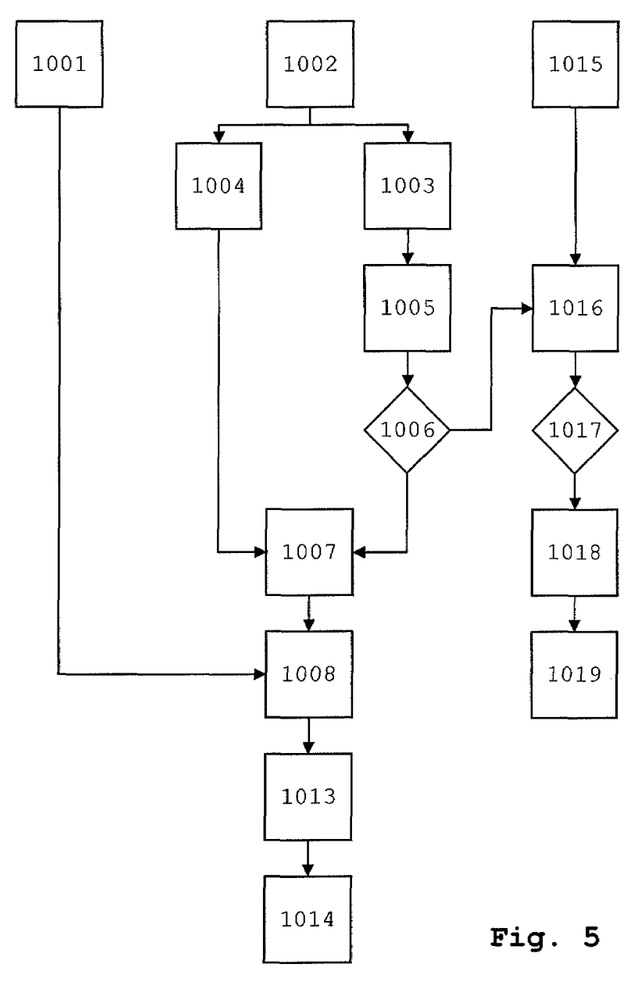
FIG. 5 shows a schematic view of steps of a method performed in a receiver of an exemplary embodiment of the invention.

In FIG. 5 additional optional steps are shown of a method performed in a receiver of an exemplary embodiment of the invention, e.g. the receiver shown in FIG. 1a. In addition to the steps shown in FIG. 4a, in the exemplary embodiment of FIG. 5 an interface 17 is selected in step 1013 to restrict the output of decoder 16 to in step 1014. If the stream_type is not found in memory 14a, the receiver 1a can be configured to rout the decrypted payload 104, which in this case is e.g.

teletext payload, based on input data that is insecurely received in the receiver. The input data containing a clear text PID 109 and clear text stream_type 110 associated with the PID 109 is e.g. received in a PMT. In step 1015 the PMT is received. In step 1016 the PID 109 from the PMT is compared with the PID 103 of the teletext payload 104. If the PIDs match, which is indicated by step 1017, a teletext decoding module 19 outside the secured domain 30 of the receiver is selected in step 1018. In step 1019 the teletext payload 104 is routed to the teletext decoding unit 19.

The additional optional steps as shown in FIG. 5 can similarly be applied to the example of FIG. 4b.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

What is claimed is:

1. A method in a receiver for processing a data stream comprising a header and an encrypted payload, the header comprising a first packet identifier, the method comprising:
   decrypting the encrypted payload to obtain a decrypted payload;
   receiving an encrypted second packet identifier and an encrypted first content type identifier;
   obtaining a second packet identifier from the encrypted second packet identifier within a secured environment;
   obtaining a first content type identifier associated with the second packet identifier from the encrypted first content type identifier within the secured environment;
   comparing the first packet identifier with the second packet identifier to obtain a first comparison result; and
   if the first comparison result matches a first predetermined condition, selecting a first decoding module based on the first content type identifier and routing the decrypted payload to the first decoding module for decoding the decrypted payload,
   receiving a clear text third packet identifier and a clear text second content type identifier associated with the third packet identifier;
   if the first comparison result matches a second predetermined condition, comparing the first packet identifier with the third packet identifier to obtain a second comparison result; and
   if the second comparison result matches a third predetermined condition, selecting a second decoding module based on the second content type identifier and routing the decrypted payload to the second decoding module for decoding the decrypted payload.

2. The method according to claim 1, wherein the encrypted second packet identifier and the encrypted first content type identifier are received in one or more encrypted entitlement messages, and wherein the second packet identifier and the first content type identifier are obtained by transmitting the one or more encrypted entitlement messages to a smartcard and receiving the second packet identifier and the first content type identifier from the smartcard over a secure connection.

3. A method in a receiver for processing a data stream comprising a header and an encrypted payload, the header comprising a first packet identifier for identifying the encrypted payload, the method comprising:
   decrypting the encrypted payload to obtain a decrypted payload;
   obtaining a second packet identifier from a hardcoded memory within a secured environment;
   obtaining a first content type identifier associated with the second packet identifier from the hardcoded memory within the secured environment;
   comparing the first packet identifier with the second packet identifier to obtain a first comparison result; and
   if the first comparison result matches a first predetermined condition, selecting a first decoding module based on the first content type identifier and routing the decrypted payload to the first decoding module for decoding the decrypted payload;
   receiving a clear text third packet identifier and a clear text second content type identifier associated with the third packet identifier;
   if the first comparison result matches a second predetermined condition, comparing the first packet identifier with the third packet identifier to obtain a second comparison result; and
   if the second comparison result matches a third predetermined condition, selecting a second decoding module based on the second content type identifier and routing the decrypted payload to the second decoding module for decoding the decrypted payload.

4. The method according to claim 3, wherein the hardcoded memory is a part of the receiver.

5. The method according to claim 3, wherein the hardcoded memory is a part of a smartcard.

6. The method according to claim 1, further comprising selecting an interface from a predefined set of interfaces based on the first content type identifier and restricting an output of the first decoding module to the selected interface.

7. The method according to claim 1, wherein
   the data stream is an MPEG2 transport stream,
   the header and the encrypted payload are part of an elementary stream in the MPEG2 transport stream,
   the third packet identifier and the second content type identifier are received in a program map table in the MPEG2 transport stream,
   the first decoding module is a video decoder or an audio decoder in a secured chipset of the receiver, and
   the second decoding module is a teletext decoder, a subtitling decoder or a software applet and is external to the secured chipset.

8. A receiver for processing a data stream comprising a header and an encrypted payload, the header comprising a first packet identifier, the receiver comprising:
   a descrambler configured to decrypt the encrypted payload to obtain a decrypted payload;
   a first input module configured to receive an encrypted second packet identifier and an encrypted first content type identifier;
   a second input module configured to receive a clear text third racket identifier and a clear text second content type identifier associated with the third packet identifier;
   a processor;
   a memory; and
   a router,
   wherein the processor is configured to:
      obtain a second packet identifier from the encrypted second packet identifier and obtain a first content type identifier associated with the second packet identifier from the encrypted first content type identifier;

store the second packet identifier and the first content type identifier in the memory;

compare the first packet identifier with the second packet identifier stored in the memory to obtain a first comparison result, a first decoding module being selected if the first comparison result matches a first predetermined condition; and if the first comparison result matches a second predetermined condition, compare the first packet identifier with the third packet identifier to obtain a second comparison result, a second decoding module being selected if the second comparison result matches a third predetermined condition, and wherein the router is configured to:

rout the decrypted payload to the first decoding module for decoding the decrypted payload or the second decoding the decrypted payload.

9. A receiver for processing a data stream comprising a header and an encrypted payload, the header comprising a first packet identifier, the receiver comprising:

a descrambler configured to decrypt the encrypted payload to obtain a decrypted payload;

an input module configured to receive a clear text third racket identifier and a clear text second content type identifier associated with the third packet identifier, a processor; and a router, wherein the processor is configured to:

obtain a second packet identifier and a first content type identifier from a hardcoded memory;

compare the first packet identifier with the second packet identifier stored in the hardcoded memory to obtain a first comparison result, a first decoding module being selected if the first comparison result matches a first predetermined condition;

if the first comparison result matches a second predetermined condition, compare the first packet identifier with the third packet identifier to obtain a second comparison result, a second decoding module being selected if the second comparison result matches a third predetermined condition, and wherein the router is configured to:

rout the decrypted payload to the first decoding module for decoding the decrypted payload or the second decoding module for decoding the decrypted payload.

10. The receiver according to claim 8, wherein the processor is further configured to select an interface from a predefined set of interfaces based on the first content type identifier and restrict an output of the first decoding module to the interface.

11. The receiver according to claim 8, further comprising a secured chipset, and wherein the descrambler, the processor, the memory, the router and the first decoding module are parts of the secured chipset.

12. The receiver according to claim 8, wherein the first input module is configured to receive the second packet identifier and the first content type identifier associated with the second packet identifier from a smartcard over a secure connection.

13. The receiver according to claim 9, wherein:

the receiver is configured to receive the second packet identifier and the first content type identifier associated with the second packet identifier from a smartcard having a hardcoded memory comprising the second packet identifier and the first content type identifier associated with the second packet identifier, and over a secure connection.

14. The method according to claim 3, further comprising selecting an interface from a predefined set of interfaces based on the first content type identifier and restricting an output of the first decoding module to the selected interface.

15. The method according to claim 3, wherein the data stream is an MPEG2 transport stream, the header and the encrypted payload are part of an elementary stream in the MPEG2 transport stream, the third packet identifier and the second content type identifier are received in a program map table in the MPEG2 transport stream, the first decoding module is a video decoder or an audio decoder in a secured chipset of the receiver, and the second decoding module is a teletext decoder, a subtitling decoder or a software applet and is external to the secured chipset.

16. The receiver according to claim 9, wherein the processor is further configured to select an interface from a predefined set of interfaces based on the first content type identifier and restrict an output of the first decoding module to the selected interface.

17. The receiver according to claim 9, further comprising a secured chipset, and wherein the descrambler, the processor, the memory, the router and the first decoding module are parts of the secured chipset.

* * * * *